United States Patent [19]
Ganzel et al.

[11] Patent Number: 5,681,098
[45] Date of Patent: Oct. 28, 1997

[54] ANTI-LOCKING BRAKE SYSTEM WITH A SWITCHABLE ORIFICE CONTROL VALVE

[75] Inventors: Blaise J. Ganzel, Ann Arbor; Ronald Sorensen, Erie, both of Mich.

[73] Assignee: Kelsey Hayes, Livonia, Mich.

[21] Appl. No.: 521,140

[22] Filed: Aug. 29, 1995

[51] Int. Cl.[6] .................................................. B60T 8/48
[52] U.S. Cl. .................. 303/119.2; 303/900; 251/129.15
[58] Field of Search ........................... 303/119.2, 116.2, 303/116.1, 900, 901; 251/129.02, 129.15

[56] References Cited

U.S. PATENT DOCUMENTS

| | | | |
|---|---|---|---|
| 3,719,401 | 3/1973 | Peruglia | 303/119.2 |
| 3,731,980 | 5/1973 | Fink et al. | 303/900 |
| 4,892,362 | 1/1990 | Takata . | |
| 4,915,459 | 4/1990 | Hashida et al. . | |
| 4,922,966 | 5/1990 | Kaes et al. | 303/119.2 |
| 4,964,680 | 10/1990 | Nokubo et al. . | |
| 5,018,797 | 5/1991 | Takata . | |
| 5,026,123 | 6/1991 | Nokubo et al. . | |
| 5,094,512 | 3/1992 | Kohno et al. . | |
| 5,242,216 | 9/1993 | Miyawaki et al. | 303/900 |
| 5,364,067 | 11/1994 | Linkner, Jr. | 251/129.02 |
| 5,393,132 | 2/1995 | Yogo et al. | 303/119.2 |

FOREIGN PATENT DOCUMENTS

| | | |
|---|---|---|
| 4312414A1 | 10/1994 | Germany . |
| 9200444 | 6/1992 | WIPO . |

*Primary Examiner*—Matthew C. Graham
*Attorney, Agent, or Firm*—MacMillan, Sobanski and Todd

[57] ABSTRACT

An anti-lock brake system having a switchable orifice control valve disposed between the master brake cylinder and the brake assembly. The switchable orifice control valve, having a valve body, a stationary member, a movable member and a solenoid coil actuated armature. The switchable orifice control valve has a normally open state, a closed state and a third state during an anti-lock mode of operation. In the third state the brake fluid from the master brake cylinder to the brake assembly flows through a calibrated re-apply orifice which controls the rate at which the pressure of the fluid being applied to the brake assembly is increased at a predetermined rate. The switchable orifice control valve is held in the third state by a pressure differential orifice between the input and output ports of the switchable orifice control valve.

3 Claims, 6 Drawing Sheets

ANTI-LOCKING BRAKE SYSTEM WITH A SWITCHABLE ORIFICE CONTROL VALVE

TECHNICAL FIELD

The invention is related to anti-lock brake systems for automotive vehicles and, in particular, to anti-lock brake systems having a switchable orifice control valve and to the structure of switchable orifice control valves useable therein.

BACKGROUND ART

Anti-lock brake systems of the type taught by Linkner, Jr. in U.S. Pat. No. 5,364,067 embody normally open isolation valves disposed between the output of the master brake cylinder and the slave cylinder of the brake assemblies to prevent further increase of the brake fluid pressure applied to the slave cylinder once a lock-up condition of one or all of the wheels is detected. After the isolation valves are closed in response to the detection of a lock-up condition, a dump valve is actuated to reduce the brake fluid pressure being applied to the brake assembly to reduce the braking torque being applied to the wheels. The anti-lock control unit will then open the isolation valve to again increase the pressure of the brake fluid being applied to the brake assembly increasing the braking torque. This cycle is repeated until the speed of the wheel is reduced below a predetermined value, the operator releases the braking force or some other braking requirement is met.

Although the operation of this type of anti-locking braking system is highly effective, the pulsing of the isolation and dump valves produces a feedback to the brake pedal during the anti-lock mode of operation which is disconcerting to some operators. To avoid the pulsation of the brake pedal, the prior art has taught various ways to eliminate this effect. Takata, in U.S. Pat. No. 4,892,362, teaches an anti-lock brake system having a differential pressure valve. The differential pressure valve has a first state in which the pressurized brake fluid from the master brake cylinder is applied directly to the brake assembly, a second state in which the pressure applied to the brake assembly is reduced as a function of discharge capacity of the dump valve and the output capacity a pump and a third state in response to the closing of the dump valve in which the pressure applied to the brake assembly is effectively the output pressure of the pump for a predetermined period of time after which the output of the master brake cylinder is applied directly to the brake assembly.

Alternately, as taught by Takata in U.S. Pat. No. 5,018,797, the position of a spool in a solenoid actuated valve, in which the rising or falling of the pressure of the brake fluid being applied to the brake assembly is controlled by the amplitude of the electric signals applied to the solenoid. Other flow control valves having a fluid control orifice are taught by Bosch in German Patent No. 43 12 414, Hashida et al. in U.S. Pat. Nos. 4,964,680 and 5,026,123 and Kohno et al. in U.S. Pat. No. 5,094,512.

The invention is a switchable orifice control valve for an anti-lock brake system which reduces the disconcerting feedback to the brake pedal.

SUMMARY OF THE INVENTION

The invention contemplates a switchable orifice control valve and an anti-lock brake system using the switchable orifice control valve.

The invention further contemplates a switchable orifice control valve having a normally open state, a closed state, and a third state in which the fluid flow therethrough is controlled by a re-apply orifice.

The invention further contemplates an anti-lock brake system in which the fluid brake pressure applied to the brake assembly through the re-apply orifice increases at a predetermined rate minimizing the feedback to the brake pedal.

The invention further contemplates a control valve in which the low resistance normally open fluid path is initially closed by a solenoid action.

Still further, the invention contemplates that the low resistance flow path remains in the closed state after the solenoid is de-energized by a differential pressure.

Yet another object of the invention is that the control valve always returns to the normally open state when the solenoid valve is deenergized.

The invention further contemplates a control valve having a valve body receivable in a valve cavity of a valve housing. A stationary member is disposed in an axial bore of the valve body and is attached thereto. The stationary member has a coaxial bore which functions as an outlet port. A movable member is disposed in the axial bore of the valve body and is axially movable relative to the stationary member. The movable member has at least an axial fluid passageway, a calibrated re-apply orifice and a valve seat serially connected to each other.

An armature is disposed adjacent to the movable member. The armature has a valve member engageable with the valve seat to inhibit a fluid flow through the re-apply orifice. A coil spring resiliently biases the movable member to engage the valve seat with the valve member and to displace the movable member away from the stationary member to provide a low resistance fluid path between the outlet port and an inlet port.

A solenoid coil circumscribes the armature and is operative, when energized, to displace the movable member into a sealing engagement with the stationary member and to occlude the low resistance fluid path. The movable member is responsive to a differential pressure to hold the movable member sealingly engaged with the stationary member independent of the location of the armature relative to the movable member. The fluid flow between the inlet port to the outlet port being controlled by the re-apply orifice when the armature is displaced away from the movable member and the movable member is sealingly engaged with the stationary member.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
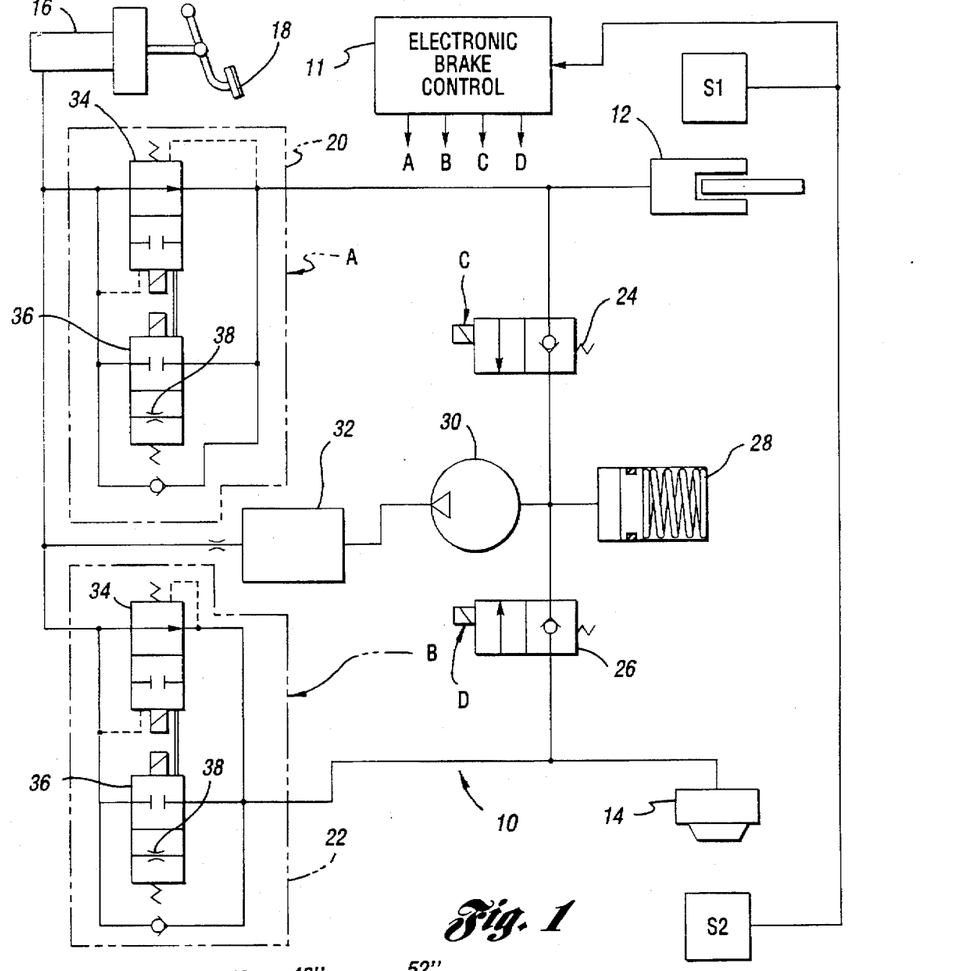
FIG. 1 is a hydraulic schematic of a braking system embodying an anti-lock braking system.

FIG. 1 is a schematic diagram of an anti-lock brake system 10 for an automotive vehicle having at least a front wheel disc brake assembly 12 and a rear wheel drum brake assembly 14 as is known in the art. The schematic diagram is for one-half of a brake system for a four wheel vehicle to simplify the drawing and the following description.

The brake assemblies 12 and 14 each have a respective slave cylinder which is responsive to pressurized brake fluid to actuate the brake assemblies 12 and 14 which, in turn, apply a braking torque to the associated wheel. A master brake cylinder 16 produces a pressurized brake fluid to the slave cylinder of brake assemblies 12 and 14 which is a function of the force applied to a brake pedal 18 by the operator. The pressurized fluid output of the master brake cylinder 16 is transmitted to the slave cylinder of brake assembly 12 through a normally open switchable orifice control valve 20 and to the slave cylinder of brake assembly 14 through a normally open switchable orifice control valve 22.

The output of switchable orifice control valve 20 is connected to the slave cylinder of brake assembly 12 and the output of switchable orifice control valve 22 is connected to the slave cylinder of brake assembly 14. The output of the switchable orifice control valve 20 is also connected to the input to a normally closed dump valve 24 while the output of the switchable orifice control valve 22 is connected to the input of a normally closed dump valve 26.

The outputs of the dump valves 24 and 26 are connected to each other, to a low pressure accumulator 28 and to the input of a pump 30. The output of pump 30 is connected to inputs to the switchable orifice control valves 20 and 22 through an attenuator 32.

Switchable orifice control valves 20 and 22 are substantially identical to each other and functionally comprise a first solenoid actuated valve 34 switchable from a normally open state to a closed state and a second solenoid actuated valve 36 switchable from a normally open re-apply orifice state to a closed state. The first solenoid valve 34, once placed in the closed state, is pilot actuated to remain in the closed state until the pressure of the brake fluid applied to the input and the pressure existing at its output are substantially equal. In the preferred embodiments, the first and second valves 34 and 36 are embodied in a common valve body and are both actuated by the same solenoid.

The operation of the brake system 10 shown on FIG. 1 will be discussed relative to the brake fluid pressure curve 40 shown in FIG. 2. During normal braking in the absence of wheel lock-up, the pressurized brake fluid produced by the master brake cylinder 16 in response to the depression of the brake pedal 18 is transmitted directly to the associated brake assemblies 12 and 14 through the first solenoid valves 34 in the switchable orifice control valves 20 and 22, respectively. In this state, the operator of the vehicle has direct control of the braking torque produced by the brake assemblies 12 and 14.

Figure 2:
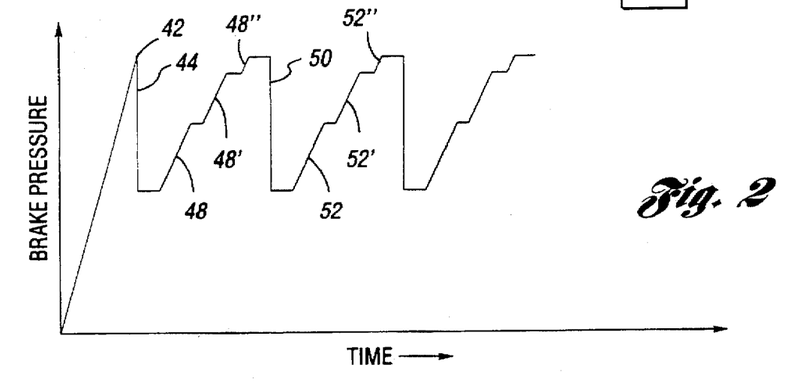
FIG. 2 is a brake pressure versus time curve representing the brake fluid pressure applied to the brake assembly in an anti-lock mode of operation.

When a lock-up condition of one or all of the wheels is detected by an electronic brake control 11, the normally open first and second solenoid valves 34 and 36, respectively, of the switchable orifice control valve associated with the wheel or wheels experiencing the lock-up condition, are activated to their closed states to prevent further increase in the pressure of the brake fluid being applied to the associated brake assembly shown as point 42 of the brake pressure curve 40 shown in FIG. 2. For example, if only the wheel associated with brake assembly 12 is experiencing a lock-up condition, only the first and second solenoid valves 34 and 36 of the switchable orifice control valve 20 are activated to their closed state. However, if the wheels associated with both brake assemblies 12 and 14 are experiencing a lock-up condition, then the first and second solenoid valves of the switchable orifice control valves 20 and 22 are activated to the closed state.

The following discussion will be directed to the portion of the anti-lock brake system associated with the control of the brake fluid pressure applied to the slave cylinder of brake assembly 12. However, it is to be understood that the portion of the anti-lock brake system associated with the control of the brake fluid pressure applied to the brake assembly 14 operates in the same manner. The portions of the anti-lock brake systems associated with brake assemblies 12 and 14 may be actuated independently or together as is known in the art.

After the first and second solenoid valves 34 and 36 of the switchable orifice control valve 20 are activated to their closed state, the dump valve 24 is activated to its open state which allows a portion of the brake fluid trapped between the switchable orifice control valve 20 and the slave cylinder of the brake assembly 12 to be transferred to the low pressure accumulator 28. The transferred brake fluid is temporarily stored in the low pressure accumulator 28 from where it is pumped by pump 30 back to the input of the switchable orifice control valve 20. The pump 30 assures that the pressure of the brake fluid stored in the accumulator 28 is below a predetermined value so that it is below the pressure being applied to the brake assembly 12. The dumping of the fluid between the switchable orifice control valve 20 and the slave cylinder of brake assembly 12 reduces the brake fluid pressure being applied to the brake assembly 12 as indicated by segment 44 of the brake pressure curve 40 until the lock-up condition is terminated as indicated by point 46. As is known in the art, the dump valve may be opened for a fixed period of time selected to terminate the lock-up condition or be opened until the termination of the lock-up condition is detected.

Upon the termination of the lock-up condition, the dump valve 24 is deactivated and it returns to its normally closed state. Simultaneously, the second solenoid valve 36 in the switchable orifice control valve 20 is deactivated permitting pressurized brake fluid from the master brake cylinder 16 to be applied to the slave cylinder of brake assembly 12 through a reapply orifice 38. The first solenoid valve remains in the closed condition due to the pressure differential across it.

The size of the re-apply orifice 38 is selected so that the rate at which the pressure of the brake fluid being applied to the slave cylinder of brake assembly 12 increases at a reduced rate as indicated by the segment 48 of the brake pressure curve 40. This reduced rate is less than the rate at which the pressure being supplied to the slave cylinder would increase if control valve 34 was opened. The second solenoid valve 36 may be pulsed several times as indicated by the segments 48' and 48" until a lock-up condition is again detected. When the brake fluid pressure applied to the brake assembly 12 produces a braking torque sufficient to cause a lock-up condition, the second solenoid valve 36 is activated to isolate the brake assembly 12 from the master cylinder 16 and dump valve 24 is activated to dump a portion of the brake fluid trapped between the switchable orifice control valve 20 and the brake assembly 12. This again causes the pressure of the brake fluid being applied to brake assembly 12 to decrease as shown by segment 50 of the brake pressure curve 40 terminating the lock-up condition. Upon termination of the lock-up condition, the electronic control 11 will deactivate dump valve 24 and the second solenoid valve 36. Again, the deactivation of the second solenoid valve 36 will permit pressurized brake fluid to be applied from the master brake cylinder 16 to the brake assembly 12 at the reduced rate as indicated by segment 52 of the brake pressure curve 40. Again, the second solenoid valve may be pulsed several times, indicated by segments 52' and 52" until a lock-up condition is again detected. This process will be repeated until the pressure of the brake fluid produced by the master brake cylinder 16 is substantially equal to the pressure being applied to the slave cylinder of brake assembly 12 without causing a lock-up condition.

When the pressure generated by the master brake cylinder 16 is substantially equal to the pressure being applied to the slave cylinder of brake assembly 12, the first solenoid actuated valve 34 of the switchable orifice control valve 30 is returned to its normally open state providing the operator once again with full control over the braking of the vehicle.

Figure 3:
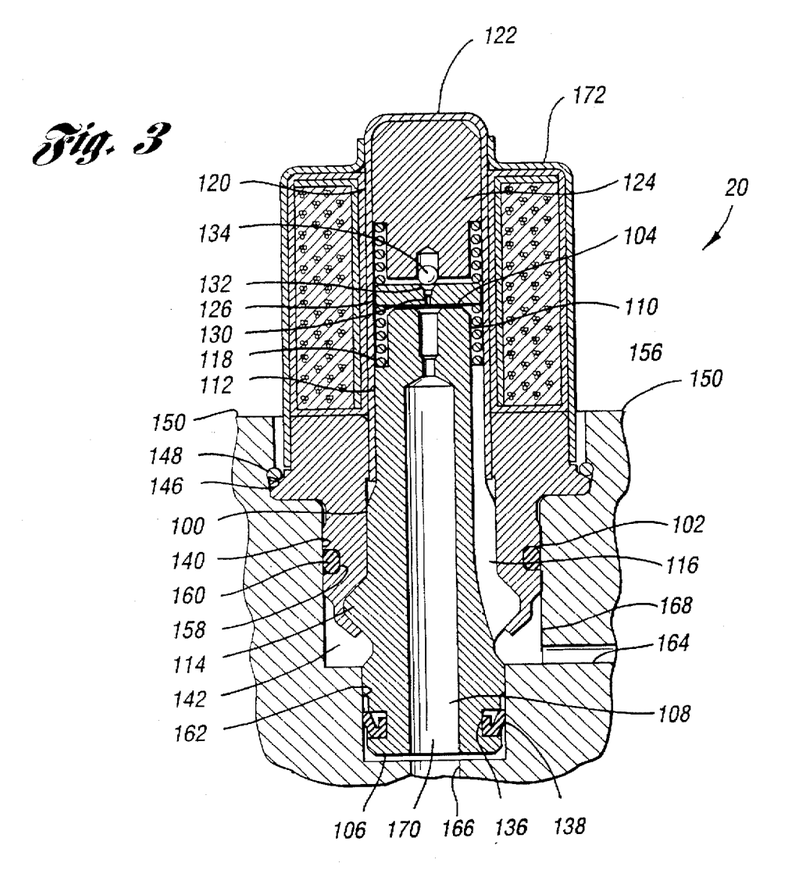
FIG. 3 is a cross-section view of the preferred embodiment of the switchable orifice control valve.

A preferred embodiment of the switchable orifice control valves 20 and 22 is shown in FIG. 3. The switchable orifice control valve 20 has a stationary cylindrical seat member 100 fixedly attached to a valve body 102. The cylindrical seat member 100 has an input end 104 having a substantially flat surface, an output end 106 and a through axial fluid passageway 108 extending from the input end to the output end. A first reduced diameter portion 110 and a second reduced diameter portion 112 is provided adjacent to the input end 104 and an annular boss 114 is provided intermediate the input end 104 and the output end 106. An offset fluid passageway 116 extends from the input end 104 to a location intermediate the annular boss 114 and the output end 106.

A seat for a first coil spring 118 is provided at the bottom of the first reduced diameter portion 110 and a cylindrical sleeve 120 is received over and sealed to the second reduced diameter portion 112. The sleeve 120 has a closed end 122 and houses an armature 124 and a displaceable disc 126. The first coil spring biases the disc 126 in a direction away from the input end 104 of the seat member. A second coil spring 128 biases the armature 124 in a direction away from the disc 126 and the input end 104 of the seat member 100. The spring force produced by the first coil spring 118 is selected to be greater than the force produced by the second coil spring 128 so that absent external forces, the first coil spring 118 resiliently biases the disc 126 and the armature 124 in a direction away from the input end 104 as shown.

The disc 126 has a calibrated re-apply orifice 130 aligned with the axial fluid passageway 108 and a valve seat 132 on the side opposite the input end 104 while the armature 124 has a valve member 134 aligned with the valve seat 132. The engagement of the valve member 134 with the valve seat 132 occludes the calibrated re-apply orifice 130 and prohibits a fluid flow therethrough. In the preferred embodiment, the valve member 134 is a ceramic ball pressed in an axial bore provided in the armature 24.

Figure 8:
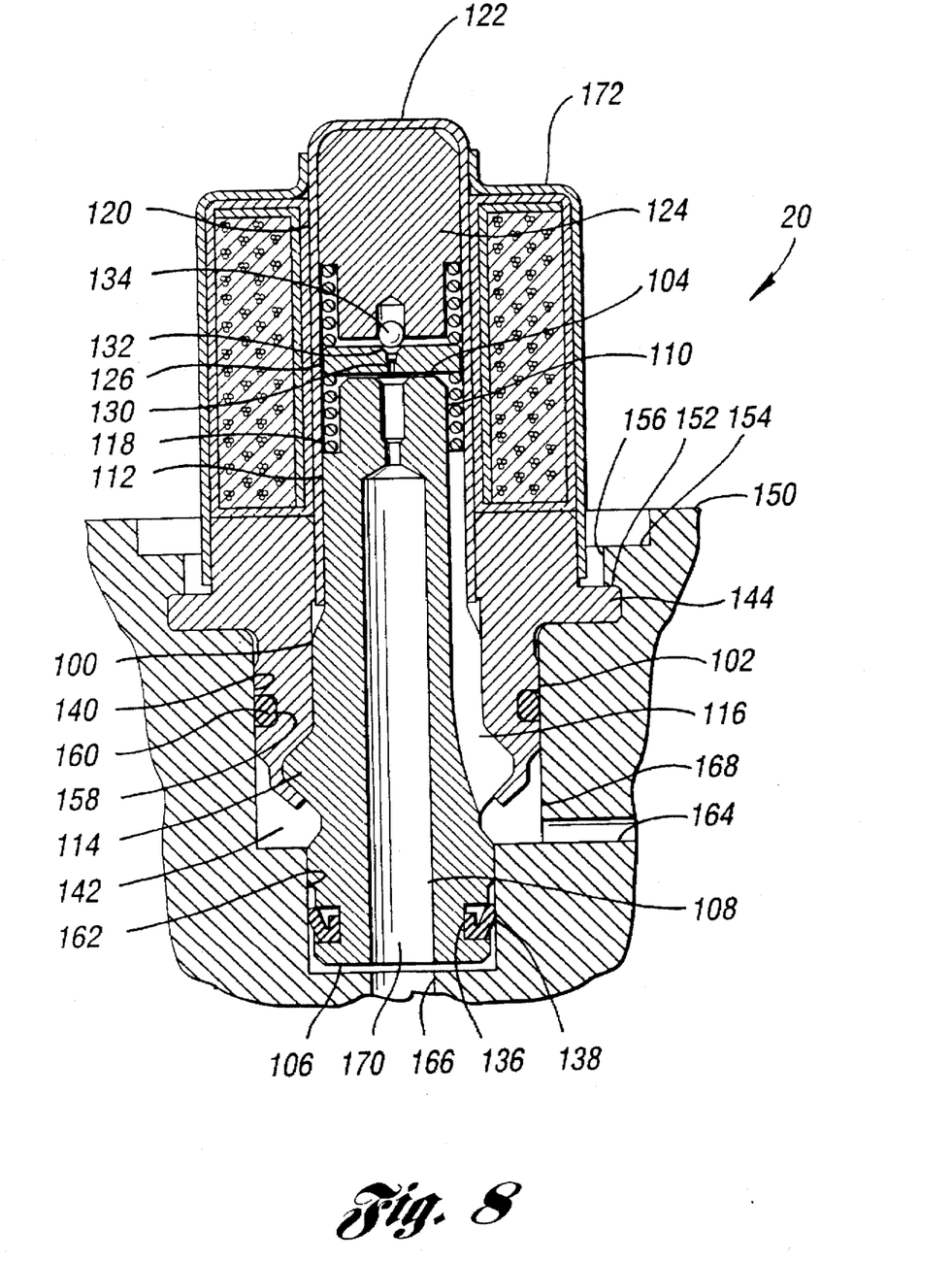
FIG. 8 is a cross-sectional view of an alternate embodiment of FIG. 3.

The valve body 102 also has a cylindrical bore 140 in which the seat member 100 is received. An annular lip 142 provided at the lower end of the valve body 102 is crimped or swaged over the annular boss 114, as shown, to lock the seat member 100 within the bore 140. The valve body 102 further has an annular flange 144. This annular flange may have a lock ring seat 146 on its upper surface to receive a lock ring 148 to lock the valve body 102 in a valve housing 150 as shown on FIG. 3. Alternatively, the annular flange may have a flat upper surface 152 as shown on FIG. 8. In this alternate embodiment, a portion 154 of the valve housing 150 is swaged over the top of the annular flange 144 to form a lip 156 which mechanically secures the valve body 102 to the valve housing 150 and forms an excellent fluid seal therebetween.

The valve body 102 may have an annular groove 158 receiving an annular seal 160, as shown on FIG. 3. However, in the second embodiment shown on FIG. 8, the annular groove 158 and annular seal 160 may be omitted. The valve housing 150 also has a reduced diameter portion 162 receiving the portion of the seat member 100 which extends beyond the lower end of the valve body 102. An annular seal 138 disposed in annular groove 136 engages the internal wall of the reduced diameter portion 162 and provides a fluid tight seal between the fluid passageways 164 and 166 formed in the valve housing 150. Preferably, annual seal 138 is a one-way fluid seal as shown.

Passageway 164 connects to the inlet port 168 of the switchable orifice control valves 20,22 and passageway 166 connects to the outlet port 170. The inlet port 168 is preferably connected by means of passageway 164 to the pressurized fluid output of the master brake cylinder 16 and outlet port 170 is preferably connected by means of passageway 166 to the slave cylinder of the associated brake assembly, such as brake assemblies 12 or 14 as shown in FIG. 1.

A solenoid coil assembly 172 circumscribes the sleeve 120 and generates, when energized, a magnet field sufficient to displace the armature 124 toward the seat member 100. The force produced by the armature 124 in response to the magnetic field is sufficient to displace the disc 126 into physical contact with the input end 104 of the seat member 100 forming a fluid tight seal therebetween.

The arrangement of the components of the switchable orifice control valve, in the absence of the initial energizing of the solenoid coil assembly are as shown in FIG. 3. In this state, the switchable orifice control valve is in a normally open state. The fluid flow is from the inlet port 168 through the offset fluid passageway 116 and through the space between the input end 104 of the seat member 100 and the disc 126 and through the coaxial fluid passageway 108 to the output port 170.

Figure 4:
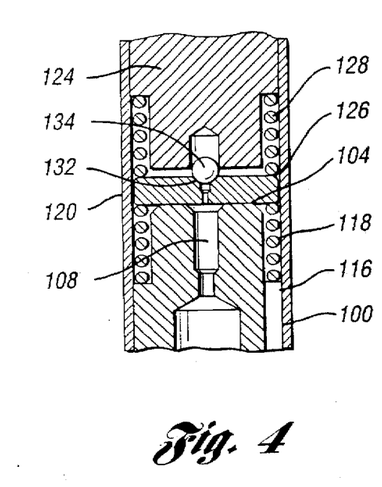
FIGS. 4 and 5 are partial cross-sections of the valve shown in FIG. 3.

Upon energizing the coil assembly 172, the armature 124 is displaced toward the input end 104 of the seat member 100. This displacement of the armature 124 causes the valve member 134 to engage the valve seat 132. The continued displacement of the armature 124 displaces the disc 126 into engagement with the flat surface provided at the input end 104 of the seat member as shown in FIG. 4. The engagement of the valve member 134 with valve seat 132 and the engagement of the disc 126 with the input end 104 of the seat member 100 terminates a fluid flow from the input port 168 to the output port 170. This, in turn, prevents a further increase in the pressure applied to the slave cylinder of the associated brake assembly.

Figure 5:
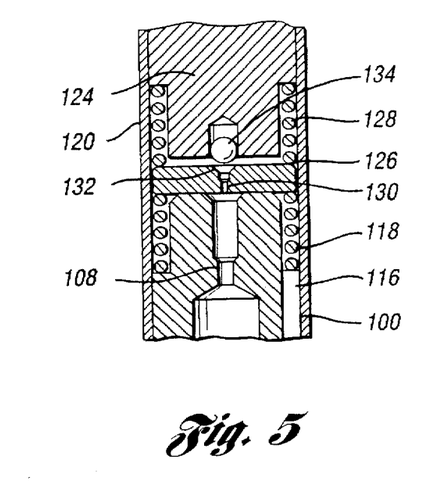

After the associated dump valve is returned to the closed position, the brake fluid pressure existing in the fluid passageway 166 is significantly lower than the brake fluid pressure being applied to the top of the disc 126 via offset passageway 116 in the spacing between the top of disc 126 and the end of the armature 124. Subsequently, upon de-energizing the coil assembly 172, the coil spring 128 will displace the armature 124 away from the disc 126. However, because of the pressure differential on opposite sides of the disc 126, a sufficient hydraulic force is generated to overcome the force of coil spring 118 which keeps the disc 126 abutted against the flat surface of the input end of the seat member 100, as shown in FIG. 5. In this state, the fluid flow from the master brake cylinder 16 is through the input port 168, through offset passageway 116, through the annular space between the disc 126 and the armature 124. From there the fluid will flow through the re-apply orifice 130, the coaxial fluid passageway 108 and to the slave cylinder of the associated brake assembly through outlet port 170.

As previously discussed, the size of the calibrated re-apply orifice 130 is selected so that the brake fluid pressure being applied to the brake assembly through the re-apply orifice increases at a predetermined rate which is substantially less than the rate when the switchable orifice valve is in its open state.

Energizing the solenoid coil assembly thereafter will block a fluid flow through the re-apply orifice 130 but the pressure differential across disc 126 will keep the disc engaged with the surface of the input end 104 of the seat member 100. When the pressure of the brake fluid at the inlet port 168 has a predetermined value relative to pressure at the outlet port 170, coil spring 118 will displace the disc 126 away from the input end 104 and the valve member 130 will again engage valve seat 132 returning the switchable orifice control valve back to its original normally open state as shown in FIG. 3.

Figure 6:
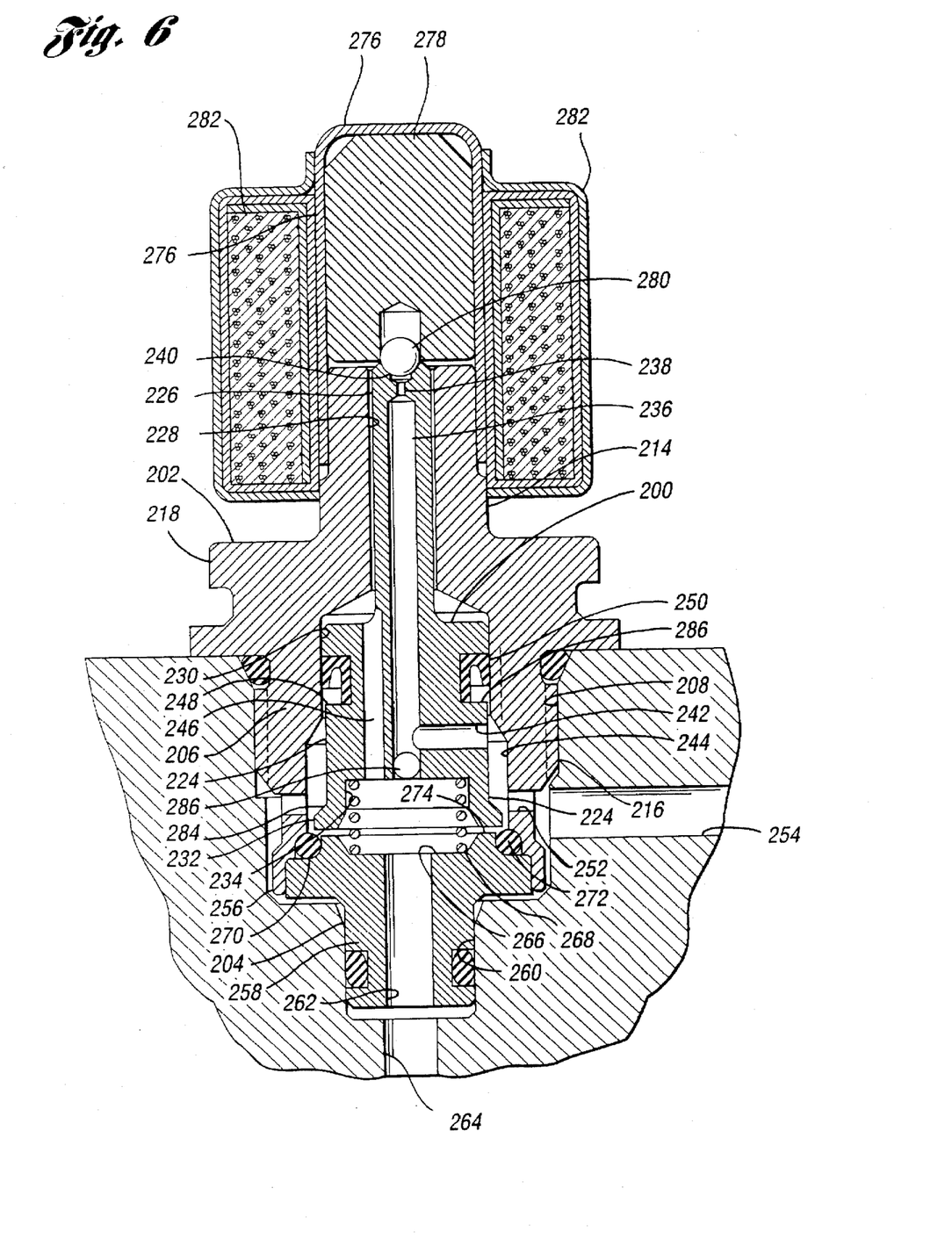
FIG. 6 is a cross-sectional view of a first alternate embodiment of the switchable orifice control valve.

A first alternate embodiment of the switchable orifice control valve is shown in FIG. 6. Referring to FIG. 6, the switchable orifice control valve 20,22 has a poppet member 200, a valve body 202, and a seat member 204. The valve body 202 has a cylindrical portion 206 receivable in a valve cavity 208 provided in a valve housing 210, a flange 212 extending radially from the cylindrical portion 206 and an external cylindrical portion 214 extending coaxially from the cylindrical portion 206.

In a first version of the valve body 202, the cylindrical portion 206, as shown on FIG. 6, has an externally threaded portion 216 which is threadably received in the valve cavity 208 and further includes a octagonally-shaped portion 218 sized to receive a drive socket. This octagonally-shaped portion 218 facilitates the threading and securing of the valve body 202 into the valve cavity 208.

Figure 9:
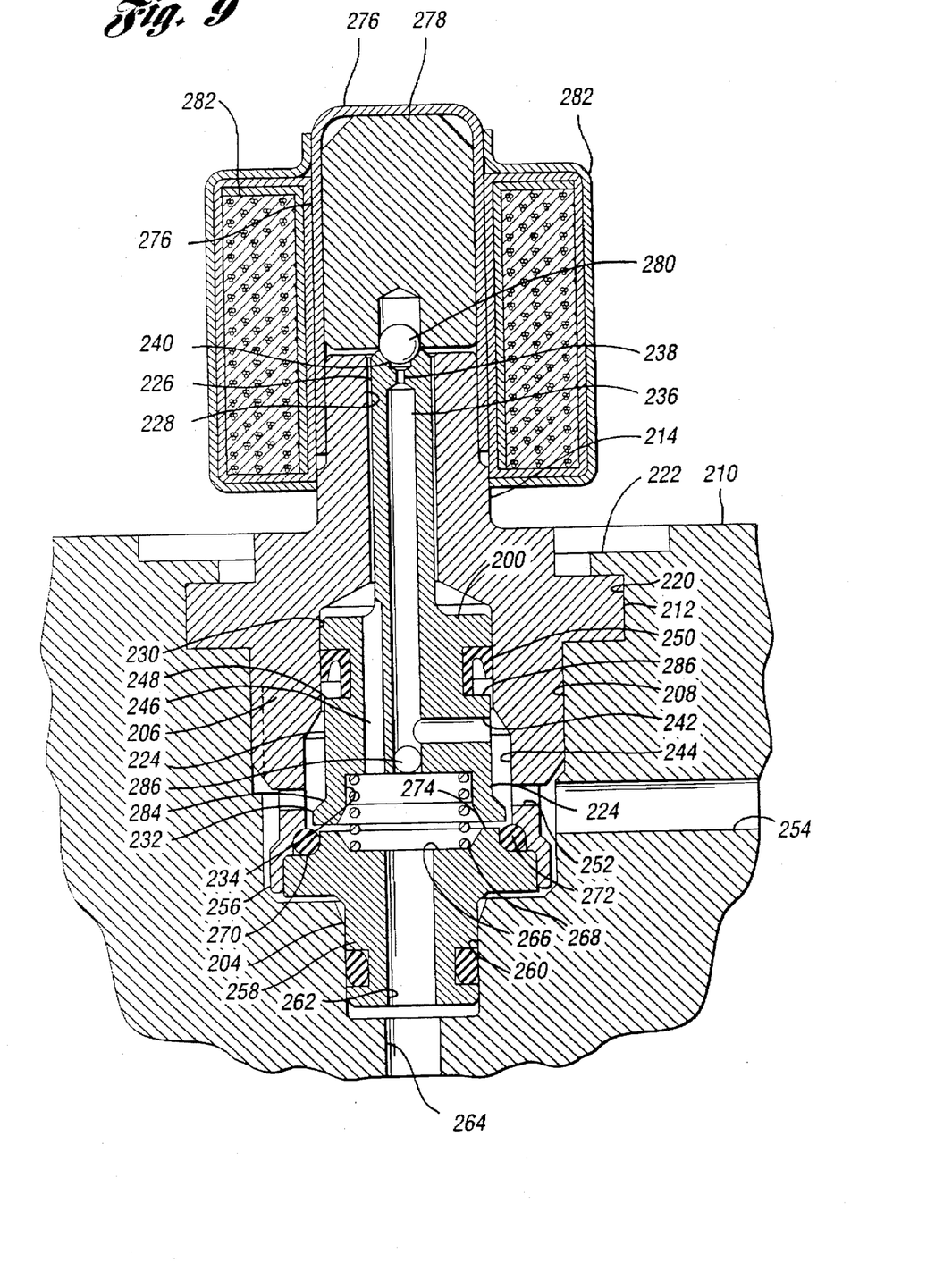
FIG. 9 is a cross-sectional view of an alternate embodiment of FIG. 6.

Alternatively, in a second version of the valve body 202 as shown on FIG. 9, the radial flange 212 is secured within a counterbore 220 provided in the valve housing 210 and a lip 222 is swaged over the upper surface of the radial flange 212 securing the valve body in the valve cavity 208 and providing a fluid-tight seal about the periphery of the radial flange 212.

The poppet member 200 has a cylindrical body portion 224 and a smaller diameter neck portion 226. The neck portion 226 is slidably received in an axial bore 228 provided in the valve body 202 and the body portion 224 is slidably received in a counterbore portion 230. The body portion 224 further has an annular flange 232 provided at the end opposite the neck portion and a cylindrical recess 234. A coaxial fluid passageway 236 is provided through the poppet member 200. One end of the fluid passageway 236 terminates in a calibrated re-apply orifice 238 and a valve seat 240. A plug, such as ball 286, is inserted into the opposite end of the fluid passageway 236 and prevents fluid flow between the cylindrical recess 234 and the fluid flow passage 236 while a radial fluid passageway 242 connects the coaxial fluid passageway 236 with an annual recess 244 provided in the walls of the counterbore 230. The diameter of the annular recess 244 is greater than the diameter of the annular flange 232 permitting the poppet 200 to be axially displaced therein.

An offset fluid passageway 246 is provided through the body portion 224 and terminates in the cylindrical recess 234. The body portion 224 further has an annular recess 248 in which is received a one-way fluid seal 250 and the valve body 202 has an input port 252 which connects the annular recess 248 to a fluid passageway 254 provided in the valve housing 210. Fluid passageway 254 in the preferred embodiment connects the input port 252 to the output of the master brake cylinder 16 as shown in FIG. 1.

The seat member 204 is connected to an annular lip 256 provided at the end of the valve body 202. The seat member 204 has a reduced diameter neck portion 258 which is received in a terminal bore 260 provided in the valve housing 210. The seat member 204 has a concentric bore which functions as an output port 262 of the switchable orifice control valve 20,22. The valve housing 210 has a fluid passageway 264 which in the preferred embodiment connects the output port 262 to a slave cylinder of an associated brake assembly 12,14. A concentric well 266 is provided in the seat member 204 adjacent to the popper member 200 which functions as a seat for a coil spring 268 which resiliently biases the poppet member 200 away from the seat member 204.

The seat member also has an annular step 270 which, in conjunction with the valve body 202, forms a seat for a resilient annular seal, such as O-ring 272. The cross-sectional diameter of the O-ring 272 is selected so that its surface protrudes above the internal end face 274 of the seat member 204 while the internal diameter of the annular step 270 is selected so that when the poppet member 200 is displaced toward the seat member 204, the O-ring 272 is engaged by the annular flange 232 prior to engaging the internal end face of the seal member 204 occluding a direct fluid path from the inlet port 252 to the outlet port 262.

A close ended sleeve 276 is sealingly attached to the external portion 214 of the valve body 202 and slidingly houses an armature 278. A valve member such as ball valve 280 is attached to the armature 278 coaxially aligned with the valve seat 240. The armature 278 is spaced from the top surface of the poppet member 202 when the valve member 280 is disengaged from the valve seat 240 providing an annular fluid passageway from the coaxial fluid passageway 236 to the annular space between the neck portion 226 of the poppet member 200 and axial bore 228.

A solenoid coil assembly 282 circumscribes the sleeve 276 and is capable, when energized, of displacing the armature 278 and the poppet member 200 a distance sufficient to sealingly engage the annular flange 232 with the O-ring 272.

The operation of the switchable orifice isolation valve is as follows. Prior to energizing the solenoid coil assembly 282, the coil spring 268 biases the poppet member 200 away from the seat member 204 a distance sufficient to form a low resistance annular fluid path between the inlet port 252 and the outlet port 262.

Upon the sensing of a lock-up condition, the solenoid coil assembly 282 energized displacing the armature 278 so that valve member 280 engaging the valve seat 240 displaces the popper member 200 a distance sufficient for the annular flange 232 to sealingly engage the O-ring seal 272 preventing any further fluid flow between the inlet port 252 and the outlet port 262. In this state, the slave cylinder of the brake assembly 12,14 is disconnected from the output of the master cylinder 16.

As discussed relative to FIG. 1, when the control valve 20 is in this state, the dump valve 24 dumps a portion of the brake fluid between the output port of the switchable orifice control valve 20 and brake assembly 12, producing a pressure differential between the inlet port 252 and the peripheral port 262. This pressure differential acting on the upper surface 284 of annular flange 232 and the exposed surface 286 of the annular recess 248 produces a force sufficient to hold the annular flange 232 of the poppet member against the O-ring 272 against the force produced by the coil spring 268.

When the lock-up condition is terminated, the associated dump valve 24 is closed and the solenoid coil assembly 282 is de-energized. The pressurized brake fluid from the master brake cylinder 10 will then displace the armature 278 away from the poppet member 200 and the ball valve 280 away from the valve seat 240. The poppet member 200, however, will remain in the displaced position due to the pressure differential between the inlet port 254 and the outlet port 262. The pressurized brake fluid received at the inlet port 252 will now flow through the radial fluid passageway 242, the coaxial fluid passageway 236, through the re-apply orifice 238, across the upper face of the poppet valve 200, and down the space between the neck 226 of the poppet member and the internal surface of the axial bore 228 of the valve body 202 and out through the outlet port 262 via offset passageway 246.

The re-apply orifice 238 is sized to increase the pressure of the brake fluid being applied to the brake assembly at the desired rate during maximum apply rate conditions.

In the state in which the annular flange 232 of the popper member 200 is held in engagement with the O-ring seal 272 by the pressure differential between the pressure at the inlet port 252 and the outlet port 262, the solenoid coil assembly 282 may be intermittently energized and de-energized as required to maintain the pressure of the brake fluid being applied to the brake assembly at a value producing maximum anti-lock braking torque.

As with the preferred embodiment, when the pressure differential between the inlet and outlet ports falls below a predetermined value, the spring 268 will disengage the popper member 200 from the O-ring seal 272 returning the isolation valve to the state shown in FIG. 6.

Figure 7:
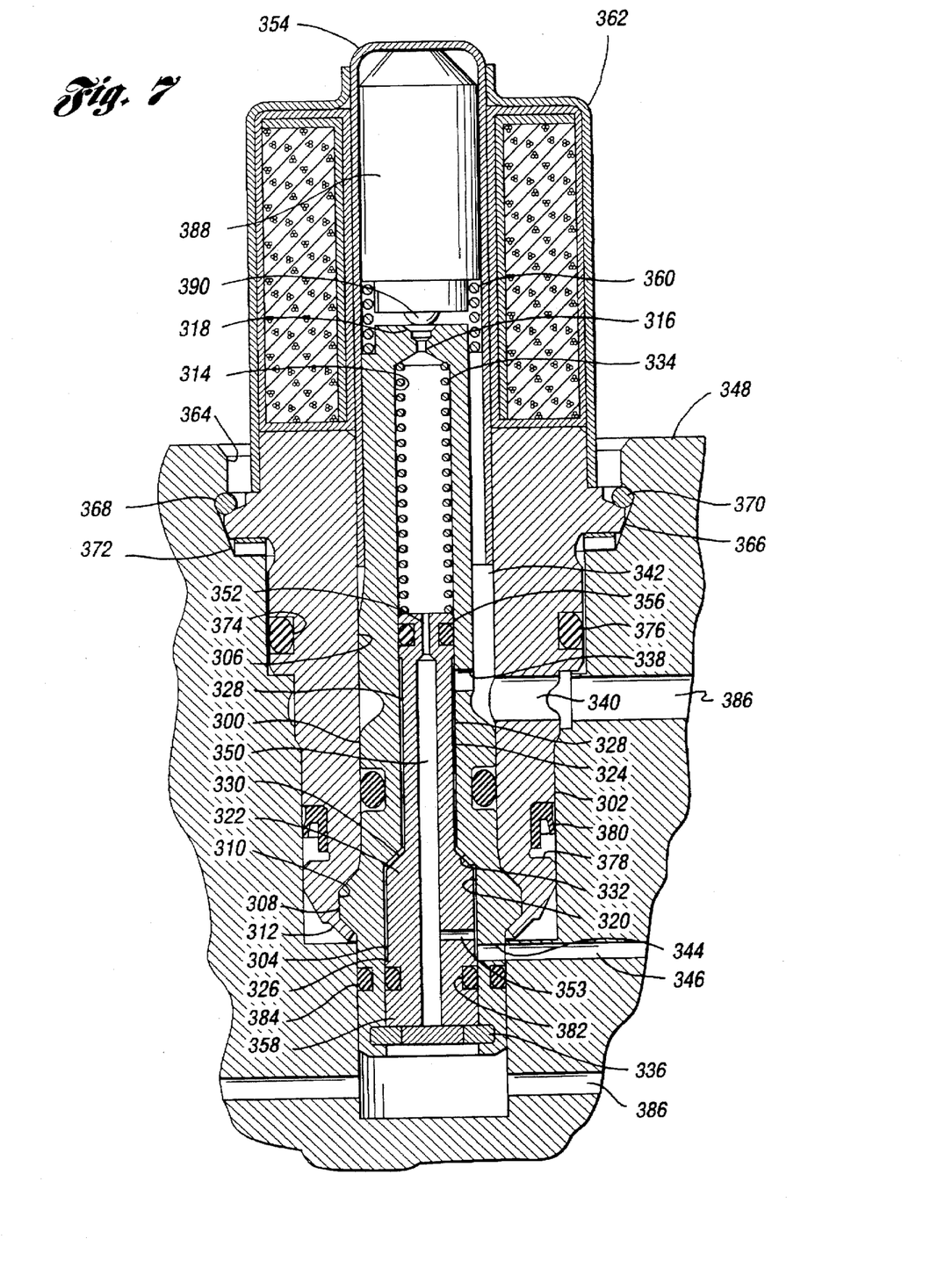
FIG. 7 is a cross-sectional view of a second alternative embodiment of the switchable orifice control valve.

Another embodiment of the switchable orifice isolation valve 20 and 22 is shown in FIG. 7. This embodiment has a cylindrically-shaped seat member 300, a valve body 302, and a piston 304. The seat member 300 is received in an axial bore 306 provided in the valve body 302. The seat member 300 has an annular boss 308 received in an annular recess 310 provided in the internal walls in the axial bore 306. A lip 312 formed at the end of the annular recess 310 is swaged over the end of the annular boss 308, as shown, to lock the seat member 300 within the valve body 302.

The seat member 300 has a coaxial fluid passageway 314 which terminates at an upper end in a calibrated re-apply orifice 316 and a valve seat 318 and at its lower end in an enlarged diameter piston chamber 320.

The piston 304 has a cylindrical base 322 received in the piston chamber 320 and a neck 324 received in the coaxial fluid passageway 314. The base 322 has a reduced diameter portion which, in cooperation with the internal wall of the piston chamber 320, forms a first annular fluid passageway 326. In a similar manner, the neck 324 has a reduced diameter portion which, in cooperation with the internal wall of the coaxial fluid passageway 314, forms a second annular fluid passageway 328. A truncated conical surface 330, which connects the base portion 322 to the neck portion 324 of the piston 304, is engageable with a mating conical valve seat 332.

A coil spring 334, disposed in the coaxial fluid passageway 314, biases the piston member 304 into abutment with a filler assembly 336 attached to the lower end of the seat member 302. The seat member 300 has a radial passageway 338 which connects the second annular passageway 328 to an outlet port 340 provided in the valve body 302 and to an offset fluid passageway 342 extending from the outlet port 340 to the top of the valve body 302. The seat member 300 also has a radially disposed inlet port 344 which connects the first annular fluid passageway 326 to a fluid passageway 346 formed in the valve housing 348. The outlet port 340 is connected to the fluid passageway 386 provided in the valve housing 348.

In a preferred arrangement, the fluid passageway 386 connects the outlet port 340 to the associated brake assembly while fluid passageway 346 connects the inlet port 344 to the output of the master brake cylinder 16 as shown in FIG. 1.

The piston 304 further has an axial passageway 350 terminating at its upper end in a reduced diameter portion 352, a radial passageway 353 connecting the axial passageway 350 to the second annular passageway 326; and annular seals 356 and 358 provided at the upper and lower ends of the piston 304 which slidingly engage the internal walls of axial passageway 314 and the piston chamber 320. The cross-sectional area of the radial passageway 353 is smaller than the cross-sectional area of the reduced diameter portion 352 which, in turn, is smaller than the cross-sectional area of the orifice 316. The axial passageway 350 is connected to a hydraulic pump, such as pump 30 shown in FIG. 1, through the filter assembly 336 and passageway 386 provided in valve housing 348.

A close-ended sleeve 354 is attached and sealed to the upper end of the seat member 300 and encloses an armature 388. A valve member 390 is attached to the armature 388 which is engageable with the valve seat 318 to prohibit a fluid flow from the fluid passageway 314 to the outlet port 340. The valve member 390 may be a hemi-spherical member as shown or a ball pressed into a bore as is known in the art. Preferably, the valve member is made from a substantially non-deformable ceramic material which is less sensitive to wear, thereby resulting in a more reliable and longer lasting valve. The armature 388 is resiliently biased away from the seat member 300 by a coil spring 360.

A solenoid coil assembly 362 circumscribes the sleeve 354 and is operative to generate a magnetic field, when energized, sufficient to displace the armature 388 against the force of spring 360 and displace the valve member 390 into sealing engagement with the valve seat 318.

The valve body 302 is receivable in a valve cavity provided in the valve housing 348. The valve cavity has a counterbore 364 sized to receive the radial flange 366 of the valve body 302. The counterbore 364 has an annular groove 368 sized to receive a snap-ring 370 to secure the valve body 302 in the valve housing 348. An annular wave spring 372 resiliently biases the valve body 302 against the snap-ring 370. The valve body 302 further has a first annular groove 374 disposed intermediate the outlet port 340 and the radial flange 366 in which is received an annular seal 376 and a second annular groove 378 intermediate the outlet port 340 and the inlet port 344 in which is received a one-way seal 380. An annular groove 382 is also provided in the lower end of the seat member 300 intermediate the inlet port 344 and the fluid passageway 352 in which is received an annular fluid seal 384. As is known in the art, these seals hydraulically seal the passageways 346, 340, and 386 provided in the valve housing 348 from each other and from the region outside the valve housing.

The operation of the switchable orifice isolation valve is as follows: When, during the normal activation of the brakes, in the absence of the detection of a lock-up condition, pressurized fluid from the master brake cylinder, such as a master brake cylinder 16 shown in FIG. 1, will flow from the input port 344 to the outlet port 340 through the first and second annular passageway 326 and 328, respectively, and through the radial fluid passageway 338.

Upon the detection of a brake lock-up condition, the dump valve, for example dump valve 24, will be energized to its open state and solenoid coil assembly 362 will be energized, displacing the armature 388 toward the seat member 300 thereby causing the valve member 390 to engage the valve seat 318. The pump, such as pump 30 in FIG. 1, will produce pressurized fluid hydraulically biasing the piston 304 in an upward direction causing the conical surface 330 to be sealingly engaged to the conical valve seat 332. The engagement of the conical surface 330 by the valve seat 332 will inhibit a fluid flow from first annular passageway 326 to the second annular passageway 328 thereby terminating a direct fluid flow from the inlet port 344 to the outlet port 340.

The seating of the valve member 390 on the valve seat 318 also prohibits a fluid flow to the outlet port 340 through the re-apply orifice 316. In this state, the switchable orifice control valve is in a closed state prohibiting a fluid flow through the switchable orifice isolation valve.

After the lock-up condition is terminated, the dump valve 24 is de-energized and returns to its normally closed state, and the solenoid coil assembly 362 is de-energized allowing the spring 360 to displace the armature 388 and the valve member 390 away from the valve seat 318. In this state, pressurized fluid received at the input port 344 is communicated to the outlet port 340 through the first annular passageway 326, the radial passageway 353, axial passageways 350 and 314, and through the re-apply orifice 316. From there, across the top of the seat member and to the outlet valve 340 via offset passageway 342. This fluid will then flow through passageway 386 to the brake assembly causing the pressure being applied to the brake assembly to increase at the reduced rate. The solenoid coil will be repeatedly energized until a lock-up condition is once again sensed.

Upon the detection of a subsequent lock-up condition, the dump valve 24 is energized to its open state and solenoid coil assembly 362 is activated causing the valve member 390 to once more engage the valve seat 318, placing the switchable orifice control valve to its closed state. The energizing and de-energizing of the dump valve 24 and the solenoid coil assembly 362 will be repeated until the anti-lock braking procedure is terminated. Upon termination of the anti-lock braking procedure, the pump 30 is turned off and the piston 304 resiliently biased by spring 334 will return to the normally open state shown in FIG. 7.

While the best mode for carrying out the invention has been described in detail, those familiar with the art to which this invention relates will recognize various alternative designs and embodiments for practicing the invention as defined by the following claims.

What is claimed is:

1. An anti-lock brake system for an automotive vehicle having an operator actuated master brake cylinder generating pressurized brake fluid and a brake assembly associated with each wheel of the vehicle to generate a braking torque in response to the pressurized fluid, said anti-lock brake system for each wheel comprising:

a switchable orifice control valve having an input connected to the master brake cylinder and an output connected to the associated brake assembly, said switchable orifice control valve having a normally open state, a closed state and switchable to a third state in which a calibrated orifice is interposed between the master brake cylinder and the brake assembly in response to a first switching of said switchable orifice control valve to said closed state;

a low pressure accumulator;

a dump valve connected between the brake assembly and said low pressure accumulator to transfer a predetermined quantity of the pressurized brake fluid from said brake assembly to said low pressure accumulator in response to the detection of a wheel lock-up condition, said transferred brake fluid reducing the pressure of the brake fluid being applied to the brake assembly;

a pump connected to said low pressure accumulator to maintain the pressure of the fluid in said low pressure accumulator below a predetermined value; and wherein said switchable orifice control valve comprises:
a valve housing having at least one valve cavity provided therein;
a valve body receivable in said valve cavity, said valve body having an axial bore therethrough;
means for securing said valve body in said valve cavity;
a stationary member fixedly disposed in said axial bore of said valve body, said stationary member having an internal portion extending inwardly from said valve body into said valve cavity and an external portion extending external to said valve housing, said stationary member further having an axial fluid passageway forming an outlet port, an offset fluid passageway radially displaced from said axial fluid passageway forming an inlet port and a sealing surface provided at an end of said external portion;
a disc member disposed adjacent to said sealing surface of said external portion and axially movable relative to said stationary member, said disc member having at least an axial fluid passageway, a reduced flow rate reapply orifice and a valve seat serially connected to each other and axially aligned with said axial fluid passageway of said stationary member, said disc member having a bottom surface sealingly engageable with said sealing surface to prohibit a fluid flow therebetween;
a sleeve having a closed end and an open end, said open end sealingly attached to said external portion of said stationary member;
an armature slidably disposed in said sleeve, said armature including a valve member engageable with said valve seat to prohibit a fluid flow through said calibrated re-apply orifice;
a first resilient member disposed between said disc member and said stationary member to produce a first resilient force biasing said disc member in a direction away from said stationary member;
a second resilient member disposed between said disc member and said armature to produce a second resilient force biasing said armature in a direction away from said disc member, said first resilient force produced by said first resilient member being greater than said second resilient force produced by said second resilient member such that in the absence of a hydraulic force acting on said disc member, said disc member is displaced away from said stationary member by said first resilient force; and a solenoid coil assembly circumscribing said sleeve, said solenoid coil assembly operative to produce a magnetic field, when energized, acting on said armature to produce a force sufficient to displace said armature in a direction toward said stationary member a distance sufficient to engage said valve member with said valve seat and to displace said disc member to engage said bottom surface with said sealing surface of said external portion of said stationary member to inhibit a fluid flow from said inlet port to said outlet port, said disc member in said displaced position responsive to a fluid pressure difference between said inlet and said outlet port being greater than a predetermined value to remain in said displaced position against the force of said first resilient member when said solenoid coil assembly is de-energized displacing said valve member from said valve seat.

2. A control valve receivable in a valve cavity of a valve housing for an anti-lock brake system for an automotive vehicle, said control valve comprising:

a valve body receivable in the valve cavity of the valve housing, said valve body having an axial bore;

a stationary member disposed in said axial bore and fixedly attached to said valve body, said stationary member having an internal portion extending inwardly from said valve body into said valve cavity and an external portion extending external to the valve housing, said stationary member further having an axial fluid passageway forming an outlet port, an offset fluid passageway radially displaced from said axial fluid passageway forming an inlet port and a sealing surface provided at an end of said external portion;

a disc member disposed adjacent to said sealing surface of said external portion and axially displaceable relative to said stationary member, said disc member having at least an axial fluid passageway having a reduced flow rate reapply orifice and a valve seat serially connected to each other and axially aligned with said axial fluid passageway of said stationary member, said disc member having a bottom surface sealingly engageable with said sealing surface to prohibit a fluid flow therebetween;

a sleeve having a closed end and an open end, said open end sealingly attached to said external portion of said stationary member and extending externally therefrom;

an armature slidably disposed in said sleeve, said armature including a valve member engageable with said valve seat;

a first resilient member disposed between said disc member and said stationary member to produce a first resilient force biasing said disc member in a direction away from said stationary member;

a second resilient member disposed between said disc member and said armature to produce a second resilient force biasing said armature in a direction away from said disc member, said first resilient force being greater than said second resilient force such that in the absence of a hydraulic force acting on said disc member to displace said disc member toward said stationary member, said disc member is displaced away from said stationary member; and a solenoid coil assembly circumscribing said sleeve, said solenoid coil assembly operative to produce a magnetic field, when energized, acting on said armature to produce a force sufficient to displace said armature in a direction toward said stationary member a distance sufficient to engage said valve member with said valve seat and to displace said disc member to engage said bottom surface with said sealing surface of said external portion of said stationary member to inhibit a fluid flow from said inlet port to said outlet port, said disc member in said displaced position responsive to a fluid pressure difference between said inlet and said outlet port being greater than a predetermined value to remain in said displaced position against the force of said first resilient member when said solenoid coil assembly is de-energized displacing said valve member from said valve seat thereby limiting the fluid from said inlet port to said outlet port through said reapply orifice.

3. The control valve of claim 2 wherein said valve cavity includes a counterbore forming a valve body seat, said valve body further includes a radial flange receivable in said counterbore and wherein said control valve further includes means for securing said radial flange against said valve body seat.

* * * * *